United States Patent [19]

Huang

[11] Patent Number: 5,439,628
[45] Date of Patent: Aug. 8, 1995

[54] METHOD FOR MANUFACTURING POLYPROPYLENE FILM AND SHEET

[75] Inventor: Hwang-Wen Huang, Taipei, Taiwan

[73] Assignee: Inteplast Corporation, Livingston, N.J.

[21] Appl. No.: 187,086

[22] Filed: Jan. 25, 1994

Related U.S. Application Data

[63] Continuation-in-part of Ser. No. 35,212, Mar. 22, 1993, abandoned.

[51] Int. Cl.$^6$ .............................................. B29C 43/24
[52] U.S. Cl. ........................................ 264/175; 264/211; 264/349; 425/363; 525/240; 524/449; 524/494; 523/348
[58] Field of Search ................... 264/175, 211, 349; 425/363, 367; 525/240; 524/449, 494; 523/348

[56] References Cited

U.S. PATENT DOCUMENTS

| | | |
|---|---|---|
| 2,462,331 | 2/1949 | Myers . |
| 3,184,526 | 5/1965 | Klug . |
| 3,328,503 | 6/1987 | Ancker . |
| 3,553,302 | 1/1971 | Susuki et al. ............... 264/211 |
| 3,660,551 | 5/1972 | Susuki . |
| 3,775,521 | 11/1973 | Yamamoto et al. ......... 264/211 |
| 3,993,718 | 11/1976 | Bontinck . |
| 4,014,636 | 3/1977 | Pawelczyk ................. 425/367 |
| 4,124,563 | 11/1978 | Onozuka . |
| 4,144,430 | 3/1979 | Dereppe . |
| 4,148,780 | 4/1979 | Blümel et al. .............. 264/175 |
| 4,311,658 | 1/1982 | Nicoll . |
| 4,345,046 | 8/1982 | Ejk et al. . |
| 4,615,853 | 10/1986 | Aoyama et al. . |
| 4,695,239 | 9/1987 | Klepsch et al. . |
| 5,063,005 | 11/1991 | Doheny, Jr. . |
| 5,264,174 | 11/1993 | Takei et al. ............... 264/211 |

FOREIGN PATENT DOCUMENTS

| | | | |
|---|---|---|---|
| 0520122 | 12/1955 | Canada ..................... | 264/175 |
| 0040298 | 11/1981 | European Pat. Off. ..... | 264/175 |
| 3015465 | 10/1981 | Germany . | |
| 3122607 | 12/1982 | Germany ................... | 264/211 |
| 47-3540 | 1/1972 | Japan . | |
| 49-5731 | 2/1974 | Japan . | |
| 49-121845 | 11/1974 | Japan ........................ | 264/175 |
| 53-119946 | 10/1978 | Japan . | |
| 56-113429 | 9/1981 | Japan ........................ | 264/211 |
| 59-11222 | 1/1984 | Japan ........................ | 264/175 |
| 62-010141 | 1/1987 | Japan . | |
| 62-027438 | 2/1987 | Japan . | |

*Primary Examiner*—Jeffery R. Thurlow
*Attorney, Agent, or Firm*—Kenneth P. Glynn; Driscoll, Stephen J.

[57] ABSTRACT

The present invention is directed at polypropylene compositions containing a high level of filler, at a calendering process which uses the compositions to produce polypropylene films and sheets, and at the film or sheet produced from that process. The process of manufacturing polypropylene film involves formulating a polypropylene composition containing a resin, filler, matrix modifier, and processing aid. The resin comprises polypropylene resin ranging in concentration from about 100 to about 70 parts per hundred parts by weight of resin (PHR), and polyethylene resin ranging in concentration from about 0 to 30 PHR. The matrix modifier amounts to about 2 to 40 PHR. The filler ranges in concentration from about 0 to 450 PHR. The processing aid ranges in concentration for about 0 to 5.0 PHR. The composition is then mixed to obtain a homogeneous and plasticized mixture. Next, the mixture is calendered into a film using a calender unit having a multiplicity of rolls, the rolls having a surface temperature between 200° C. and 250° C. After calendering, the film is removed using take-off rolls and cooled to ambient temperature.

15 Claims, No Drawings

METHOD FOR MANUFACTURING POLYPROPYLENE FILM AND SHEET

REFERENCE TO RELATED CASE

This application is a continuation-in-part of U.S. patent application Ser. No. 08/035,212 filed on Mar. 22, 1993 by Hwang-Wen Huang, entitled "Method of Manufacturing Polypropylene for Film or Sheet," which has been abandoned in favor of the present application and incorporated by reference herein.

BACKGROUND OF THE INVENTION (a) Field of the Invention

The present invention relates to highly filled polypropylene compositions, to a novel calendering process using the compositions for production of polypropylene film (having a thickness of 250 $\mu$m and under) or sheets (having a thickness of over 250 $\mu$m), and to the polypropylene film or sheet produced from the process.

(b) Information Disclosure Statement

The calendering process was originally developed for the continuous manufacture of rubber sheet. It was later adapted to the manufacture of films and sheets of thermoplastics such as poly vinyl chloride (PVC), and, to a limited extent, polyolefins. Polyethylene films with filler content below 200 parts per hundred parts of resin by weight (PHR) have been commercially made by calendering process. However, polypropylene films and sheets are generally manufactured by processes other than calendering such as casting, blown film extrusion and flat-die extrusion with mineral filler CaCO$_3$ content less than 100 PHR.

Various disclosures related to the manufacturing of polypropylene films and sheets by means of calendering have been made. Although production of smooth polypropylene sheets on calender has been achieved with limited success at low production rates and narrow web width, the surface smoothness decreases when the production rate and web width are increased. A major problem, which has stalled the progress of calendering of polypropylene, is that polypropylene tends to adhere persistently to the calender roll surface. Moreover, because it is more vulnerable to oxidative degradation and viscosity drop at elevated temperatures (i.e. greater than 210° C.), no "bank" formation between the calender rolls occurs and polypropylene sheet formation is rendered impossible.

U.S. Pat. No. 2,462,331 discloses a calenderable, no filler added, polyethylene composition for hot-calendering on paper, fabric or other substrates. The lubricants used in this composition comprise a polyhydric alcohol ester of, or a metal salt of, a mono-carboxylic fatty acid having 12 to 24 carbon atoms.

U.S. Pat. No. 3,184,526 discloses a solution casting technique by calendering diluent-wet polymer for the production of self-supporting, no filler added, clear film. The polymer could be polyethylene or stereoregular polypropylene. Selecting proper diluent solvent and evaporating solvent from the extrudate are considered critical in this invention.

U.S. Pat. No. 3,328,503 discloses a process for forming oriented no-filler-added crystalline thermoplastic film and sheet which comprises passing a preformed web of molten amorphous polymer through the nip of a pair of counter-rotating rolls without forming a "bank" at the ingress side. The polymer can be polyethylene or polypropylene. A mixture of calcium stearate, stearic acid and dibutyl paracresol is disclosed as a calendering aid for polyethylene. This invention provides a method for orienting film through compression rather than tension. The absence of a "bank" at the entrance to the roll nip is considered a critical requirement in this invention. It is claimed that serious defects are formed which render the film useless when "bank" is present.

U.S. Pat. No. 3,660,551 discloses a method of improving the properties of calcium sulfite containing polyolefin sheet by virtue of inorganic acid treatment. Calcium sulfite existing near the surface of the sheet is effused and results in innumerable minute holes on the surface when the polyolefin sheet is treated with the acid solution. However, no calendering technique is taught in this prior art.

U.S. Pat. No. 3,993,718 relates a method for manufacturing an artificial paper requiring neither calendering nor biaxial orientation. The composition contains 30 to 94.8 wt. % of rigid polyolefin and 0.1 to 35 wt. % polystyrene and other ingredients.

U.S. Pat. No. 4,124,563 discloses a biaxial stretched molding sheet of a polyethylene composition containing 50–85 wt. % of calcium sulfite semi-hydrate. The specifically selected calcium sulfite is in the form of fine rectangular prismoidal crystals having a shorter axis of 1–30 $\mu$m and a long axis of 5–100 $\mu$m to allow a sufficient separation at the interfacial zone between calcium sulfite and polyethylene matrix when subjected to mechanical stresses. A method for the manufacture of the preferred calcium sulfite is also disclosed. However, neither the kneading and mixing technique for forming the composition nor the calendering and tenter stretching techniques for molding the void-possessed sheet are taught in this prior art.

U.S. Pat. No. 4,144,304 discloses a process for calendering polyolefins, including polyethylene and polypropylene, where the polyolefin is admixed with vegetable fibers. The presence of vegetable fibers prevents the mixture from sticking to the calender rolls.

U.S. Pat. No. 4,311,658 discloses a stripping process and apparatus for manufacturing thermoplastic, preferably polyvinyl chloride, sheets by calendering.

U.S. Pat. No. 4,345,046 discloses a lubricant composition for processing no-filler-added, polyolefin resins. The lubricant composition comprises a mixture of 60–70 wt. % of an N,N'-ethylene-bis-amide of a fatty acid or hydroxy-substituted fatty acid, 22–32 wt. % of a free fatty acid or hydroxy-substituted fatty acid, and 3–13 wt. % of a metal salt of a fatty acid or hydroxy-substituted fatty acid. The lubricant composition is particularly useful in the calendering of polypropylene homopolymers and copolymers when the processing temperature is around 385° F. (i.e. 196° C.). Polypropylene resins, which are preferred, have average molecular weights of about 80,000. However, calenderable, highly filled compositions are not taught in this prior art.

U.S. Pat. No. 4,615,853 discloses a method for producing thermoplastic sheet or filler-containing sheet by means of a pair of endless steel belts. A calendering method is not taught.

U.S. Pat. No. 4,695,239 relates to a calendering device following a sheet die (T-die) to produce no-filler-added sheets of thermoplastics having thickness between 100 $\mu$m and 12 $\mu$mm. Neither sheet extrusion nor calendering operation parameters are revealed in this art.

U.S. Pat. No. 5,063,005 relates to a process for preparing a heat shrinkable, no-filler-added film for pipe wraps by first forming a polyolefinic film—preferably polyethylene—on a three-roll calender. Thereafter, one surface of the resulting film is subjected to irradiation from a low energy electron beam. The technique of using the electron beam is taught in the disclosure. However, no calendering technique and operation parameters are disclosed.

Deutsche Patent No. DE3015-465 relates to polypropylene films with smooth surface, 40 to 100 $\mu$m thick, prepared by calendering above crystalline melting point and at set speed difference of successive rollers of 1.1:1. The preferred composition comprises 70–95 wt. % polypropylene with a melt index (230° C./21.6N) of 0.2–0.5 g/10 min and 5–30 wt. % polypropylene with a melt index (230° C./21.6N) of greater than 7 g/10 min, or a mixture of 75–95 wt. % polypropylene with a melt index (230° C./21.6N) of 0.2–0.5 g/10 min and 5–25 wt. % polyethylene having a melt index (190° C./21.6N) of greater than 1.0 g/10 min. In any case, the resulting composition has a melt index less than 2 g/10 min which is relatively restrictive when compared to the present invention. The composition may also contain low levels of nucleating agents and/or fillers, and heat stabilizers. However, the no-filler-added composition is preferred. The temperature of four L-shaped calender rolls is set between 200° C. and 225° C. Therefore, this disclosure specifies an operating temperature which is only the lower portion of the present invention's range, and contains no processing aids, no matrix modifiers and little or no filler.

Japan Patent No. J47-3540 discloses a calendering process, which includes a separate heat treating roll, for no-filler-added polyolefin composition to give uniform smooth surface sheets. A polyolefin sheet is uniformly calendered at temperatures around 170° C. After calendering, the film passes through treating rolls, which have a surface temperature of about 170° C., to achieve a smooth surface. Neither plasticization of the polyolefin composition nor a calendering process for producing smooth film are taught in this prior art.

Japan Patent No. J49-5731 discloses a polyethylene composition for synthetic paper with thickness ranging from 0.04 mm to 0.5 mm. The polyethylene synthetic paper is made by initially kneading a polyethylene composition containing 90–40 PHR polyethylene, 10–60 PHR ethylene-vinyl acetate (EVA) copolymer, 100–200 PHR filler and 0.5–3.5 PHR sorbitan higher fatty acid ester on a two-roll mixer. Next, the composition is molded into a sheet using a calendering process. The preferred polyethylene has a melt flow index from 0.1–2.0 g/10 min and a density of 0.94–0.95 g/cm$^3$. The preferred EVA contains 70–95 mol. % ethylene, melt flow index 0.5–20 g/10 min. The calendering technique and process of the present invention are not taught in this prior art.

Japan Patent No. J53-119946 discloses a calenderable polyolefin resin composition. The composition consists of 80–20 PHR of propylene-ethylene random copolymer containing 0.1–30 wt. % (0.1–5 wt. % preferred) ethylene and 20–80 PHR polypropylene homopolymer or propylene-ethylene block copolymer containing 0.1–5 wt. % ethylene content. The composition may further contain low loading level of colorant, heat stabilizers, lubricants, fillers, etc. However, none of the examples shown in this art contains filler in its composition. Neither plasticization of the polyolefin composition nor a calendering process are taught in this prior art.

Japan Patent No. J62-010141 discloses a porous sheet or film production method. The sheet or film is prepared by T-die extruding and stretching at a draw ratio of greater than 1.5. The film composition contains polyolefin resin such as linear low density polyethylene and high density polyethylene, filler and triglyceride. This process provides white film or sheet having continuous pores by drawing film at ordinary temperature. The resulted sheet or film can be used for clothing, medical material, hygienic material, filter, etc. This disclosure, however, does not teach a calendering process.

Japan Patent No. J62-027438 describes the formation of breathable film by uniaxially stretching a film having 42 to 87 vol. % polyolefin resin and 13 to 58 vol. % of inorganic filler, e.g., calcium carbonate. A calendering technique is not taught herein, and very fine filler (0.6 to 3 microns) is required.

SUMMARY OF THE INVENTION

The present invention is directed at highly filled polypropylene compositions and a process using the compositions to produce unshrinkable and no-void-embedded polypropylene films or sheets ranging in thickness range from 0.05 mm (50 $\mu$m) to 2.0 mm. (2000 $\mu$m). The type of polypropylene used includes homopolymer, random and block copolymers of propylene, and other olefins such as ethylene or butene-1. The polypropylene compositions also comprise fillers, wetting agents, processing aids and matrix modifiers. Other conventionally used additives such as acid acceptors, heat stabilizers, antioxidants, antistatic agents, colorants, and so forth may be included in the composition without departing from the scope of this invention.

These highly filled compositions are initially mixed and kneaded in a low speed intensive kneader at elevated temperature, then transferred to a calender unit in a band or strip to form film or sheet. The well known calender units usually employed for the manufacture of thermoplastic films and sheets are suitable for this process. Next, the film is stripped off the calender rolls using take-off rolls. Finally, the sheet goes through a series of chill rolls for cooling and solidification.

The use of this present invented process and polypropylene compositions enable the calendering process to be distinct from the conventional T-die or flat die extrusion process in various aspects such as broader thickness range (from 0.05 mm to 2.0 mm), reaching commercial acceptable speed (from 10 M/min to 130 M/min) with improved thickness control across the sheet, and using a high level of fillers (up to 450 PHR).

The polypropylene film and sheet produced from this process will possess characteristics such as low density, good heat resistance, excellent resistance to chemicals and animal/vegetable fatty oils, good thermoforming characteristics, good bending property and crack resistance. Therefore, it can be used as a replacement for wood pulp paper in applications such as writing, printing, photocopying, drawing and wrapping, etc, and in a variety of applications such as food packaging—specifically boilable or microwaveable food pouches and refrigeratable containers, appliance housings, stationery, thermoforming containers and parts, and other numerous products.

DETAILED DESCRIPTION OF THE PRESENT INVENTION

This invention relates to polypropylene compositions containing a high level of filler, to a calendering process which uses the compositions to produce polypropylene films and sheets, and to the film or sheet produced from the process. It is important to note that throughout this disclosure the terms "film" and "sheet" are used synonymously. Although these terms can be used to distinguish a product's thickness (i.e., film refers to a thickness of 250 μm and under, and sheet refers to a thickness of over 250 μm), no such distinction is intended by the use of these terms in this disclosure. The term "film" is used exclusively in the claims and refers to all thicknesses of the product including sheets, webbs, foils and films.

A. Compositions

The novel polypropylene compositions used in this invention comprise: (1) polypropylene resin ranging in concentration from about 100 to about 70 parts per hundred parts of resin by weight (PHR), (2) polyethylene resin to act as a wetting agent and as a compatibility aid, and ranging in concentration from about 0 to about 30 PHR, (3) a matrix modifier ranging in concentration from about 2 to 40 PHR, (4) a filler ranging in concentration from about 0 up to 450 PHR, and (5) a processing aid ranging in concentration from about 0.1 to about 5 PHR. In addition to the aforementioned material, the polypropylene compositions may also contain an antistatic agent ranging in concentration from about 0 to about 10 PHR, an antioxidant from 0.5 to 5 PHR, and colorants or pigments. A useful guide line for formulating the calenderable polypropylene compositions, either filled or non-filled, is to control the compounded composition such that it has (1) a broad melting transition temperature range, (2) relatively low crystallinity, and (3) a melt flow index (230° C./21.6N) in the range of 0.5 to 4 g/10 min.

Polypropylene resins, which are preferred in this invention, include homopolymer, and random and block copolymers having a Melt Flow Index (230° C./21.6N ASTM D-1238) (herein "MFI") in the range of 0.1–10 g/10 min, a specific gravity in the range of 0.890–0.910, an average molecular weight in the range of 100,000–700,000, and a molecular weight distribution ($M_w/M_n$) in the range of 4–12. Additionally, the preferred polypropylene copolymers should contain 2–18 mole percent of ethylene or butene-1. The aforementioned polypropylene or combinations of different types of polypropylenes are each suitable for calendering.

The polyethylene resin will be occluded in the pores of the filler surface due to its low viscosity relative to polypropylene at the processing temperature range. Consequently, polyethylene resin is used to encompass the filler surface and function as molecular bridges at the interface to enhance the dispersion of a high level of filler in the polypropylene matrix. The polyethylene is also used to control rheological behavior such as the viscosity, flowability, and melt fracture of the molten composition to facilitate formation of both a "bank" between the calender rolls and a uniform web over the calender rolls.

The preferred polyethylene resins include high density polyethylene (HDPE), low density polyethylene (LDPE), and linear low density polyethylene (LLDPE). The HDPE has an MFI (190° C./21.6N) in the range of 0.3–20 g/10 min and a specific gravity in the range of 0.935–0.965. The LDPE has an MFI (190° C./21.6N) in the range of 0.5–25 g/10 min and a specific gravity ranging from 0.915 to 0.930. The LLDPE has an MFI (190° C./21.6N) in the range of 0.5–25 g/10 min and a specific gravity ranging from 0.900 to 0.925. Additionally, the LLDPE resins containing 7–20 mole percent of α-olefin comonomer such as butene, hexene, 4-methyl-1 pentene and octene are preferred.

An elastomer such as ethylene-propylene-diene monomer (EPDM), ethylene-propylene monomer (EPM), polyisobutylene (PIB), butyl rubber (IIR) and neoprene, in chip or granule form, is mechanically dispersed into the polypropylene compositions as a matrix modifier to enhance the processability, tackiness, and heat stability of the polypropylene compositions. Furthermore, the matrix modifier will also improve the pliability and low temperature properties of the finished films and sheets. The preferred EPDM elastomer has comonomers of 1,4-hexadiene, dicyclopentadiene and ethyldiene in the range of 0–10 wt. % with a specific gravity of 0.850–0.900. The elastomers suitable for acting as a matrix modifier have Mooney viscosity of 25–100 $ML_{1+8}$@125° C.

Extenders or reinforcing fillers having particle sizes less than 40 μm can be highly loaded into the composition. Fillers suitable for this invention consist of wood flour, zinc oxide, chopped fiber, metal powder, mica, talc, kaolin, calcium carbonate and mixture thereof. Calcium carbonates having a mean particle size ranging 2 μm to 15 μm and a specific surface area greater than 5000 $cm^2/g$ are suitable for the polypropylene film compositions. However, the preferred calcium carbonate has a mean particle size ranging from about 2 μm to 8 μm and a specific surface area ranging from about 8,000 to about 12,000 $cm^2/g$. Talc having a mean particle size ranging from about 2 μm to 10 μm and an aspect ratio ranging from 15 to 20 are preferred in this invention. Finer fillers are used to give higher surface gloss and lower flex whitening properties. The fillers used in the highly filled polypropylene compositions also act as anti-blocking agents by preventing the film and/or sheet from sticking to the calender rolls. When compounding a high loading level of fillers into a polymer matrix, the dispersion and compatibility will be enhanced by a silane or stearate coating.

In conventional calendering or T-die extruding technology, the amount of calcium carbonate that can be added is limited by the flow properties of the compounds used. Consequently, polypropylene compositions having calcium carbonate filler up to 450 PHR have not been successfully developed in the film industry. In the present invention, however, calcium carbonate can be added up to 450 PHR because of the superior compatibility and bridging effect provided by the specifically selected polymer matrix system and specifically designed mixing procedures. The distinct difference in the additional amount of filler is an important characteristic of this invention.

The proper selection of types and quantities of processing aids depends not only on the polymer to be processed, but also on the process itself. The desired balance of processing aids provides control over the degree of fusion, output rate, heat deflection temperature and surface gloss. Combinations of predominantly fatty acid amides and free fatty acids and to a lesser extent polyol esters of monocarboxylic acid and polyols provide good lubricating and mold release qualities and are commonly used in the processing of polyolefins.

The processing aids used in this invention are metallic stearates, higher molecular weight carboxylic acid esters having carbon atoms greater than 18, and fluoro polymers having melting temperature lower than 230° C., preferably polyvinylidene fluorides, and mixtures thereof. Aside from the amide and fatty acid systems which had been disclosed in various prior arts for the processing of polyolefins, the metallic stearate and higher molecular weight carboxylic acid esters are conventionally used in PVC resins. The processing aid reduces friction between polymer molecules, promotes fusion, shortens mixing cycle, lowers melt viscosity, and decreases energy input during the calendering process. The preferred metallic stearates are calcium, barium, zinc, magnesium, and tin stearate. These processing aids have the additional benefit of aiding in metal release which improves the smoothness of the film and sheet surface. The rheological and mechanical properties in the molten state of the polypropylene composition is greatly improved due to the addition of polyethylene, a matrix modifier and a processing aid.

Ionic type antistatics are not suitable for this invention due to their poor heat stability at the elevated processing temperature. Non-ionic type antistatics, however, may be added at a dosage of 0 to 10 PHR to prevent the build up of static as long as the heat stability and compatibility with the polypropylene and/or polyethylene is considered. Non-ionic type antistatics traditionally used in such applications include polyethylene glycol-esters or -ethers, fatty acid esters, ethanol amides, mono- and diglycerides, and ethoxylated fatty amines.

B. Product by Process

The polypropylene film or sheet produced by the invented method has a thickness ranging from about 0.05 mm to about 2.0 mm and a maximum width of around 230 cm. With continued experimentation and tuning, however, these ranges are expected to increase. In addition to the benefits of mass production, the thickness distribution and flatness of the product is superior to the sheet produced by the T-die process or to the film produced by the biaxial orientation process. Certain innovations in the composition of the film also improve the products quality. For example, the matrix modifier will improve the pliability and low temperature properties of the finished films and sheets. Additionally, the polypropylene sheet produced by the invented method requires no chemical treatment to make its surface rough and coarse to resemble paper because of the extra-fine filler particles effusing from its surface. The processing aids also have the additional benefit of aiding in metal release which improves the smoothness of the film and sheet surface.

Various typical applications of the invented polypropylene films and sheets products are partially listed as follows:

(a) Paper replacement: The polypropylene sheet or film produced by this invention can be used to replace wood pulp paper in applications such as writing, printing, photocopying, drawing and wrapping, etc. With the world-wide trend towards forest protection and the pressure of price ascension of wood pulp, the product of this invention will be highly competitive in the paper market.

(b) Stationery: Wrapper file covers, multi-data filing systems, and documents storage containers are just an example of its stationery applications.

(c) Thermoforming: Thermoforming products include cups, dishes, bowls, and fresh food containers. These products can be refrigerated and/or boiled due to the wide temperature range polypropylene can withstand.

(d) Folding boxes: Polypropylene film/sheet possesses excellent properties such as living hinge capability, rigidity, moisture resistance and good printability. For example, polypropylene can be used in the manufacture of picnic boxes, fast-food boxes, albums, drink containers, data boxes and cassette boxes.

C. Process

The calendering line used in this invention comprises the following equipment: (1) a raw material bulk handling and mixing system, (2) a fluxing and continuous calender feeding system, (3) a calender unit and (4) post-calendering treatment including take-off rolls, embossing rolls, cooling rolls, a corona treater and a winder. Since continuous mixing has the disadvantages of generating lower dispersive mixing quality and possessing less flexibility in switching to new compositions, the polypropylene compositions prepared according to the aforementioned dosing range and combinations are initially mixed and kneaded in an intensive mixer such as a kneader having a pair of rotors and a mixing chamber. The kneader, in addition to imparting extensive mixing, provides high shear stress allowing dispersive mixing and homogenization to take place. Operating conditions such as maintaining a temperature of 170°–210° C. in the kneader, turning the rotors between 15 and 45 RPM, maintaining a speed ratio range of 1:1 to 1.3:1 between the rotors, filling the volume in the mixing chamber from 80 to 100%, and mixing the composition for 8–22 minutes in the kneader are selected to optimize the dispersion and plasticization effect.

The sequence and time interval of introducing the material into the mixer, especially for the compositions having a high loading level of filler, is critical in achieving desired dispersion and plasticization. The material infeed techniques include sequential procedures and, alternatively, a dumping method. In the sequential procedures, ingredients are added in an optimal time and temperature sequence. One of the preferred mixing sequences, for example, is initially to melt and blend the resins and other materials together except fillers for a few minutes and then to feed the fillers in two or three portions. The ingredients are evenly distributed into a dry-blend by a non-fluxing blender when the dumping method is used. The dry preblend is then fed into the kneader to obtain a homogeneous and plasticized mixture.

In one particular embodiment, the mixture is further molded into a band and/or strip by the fluxing extruder prior to transferring the molten compound to the calender unit. The extruder, acting as a strainer, will also filter out contaminants from stock before reaching the calender. The fluxing extruder could discharge onto an optional two-roll mill, which is mainly used as a buffer. After that, the band- or strip-form extrudate is transferred into the calender unit through a swivel conveyor. The gaps, temperatures, speeds, and speed differences between calender rolls are controlled to obtain optimal thickness distribution and surface smoothness. The optimal conditions will be those whereby the resin composition is maintained at a temperature above its melting point while it is flowing through the calender, and whereby a smooth rolling bank of composition is formed and maintained at each nip of the calender rolls. In this invention, the optimal operation temperature ranges from 200 to 245° C. and the roll speed difference ranges from 1.0 M/min to 3.5 M/min.

The well known calender units usually employed for the manufacture of thermoplastic films and sheets are suitable for this process. Suitable units include, but are not limited to, 4-roll, 5-roll and 6-roll calenders having various configurations such as stacked "L", inverted "L", "Z", and inclined "Z". A calender unit having high thermo conductive guiding plates and straight contour on #4 and #5 rolls is preferred for operation up to 250° C. In addition, instead of the regular chrome-plated or rubber-covered take-off rolls, a teflon and/or silicone coated take-off rolls with diameters from about 80 to about 200 mm are used to facilitate the film and sheet production. The take-off ratio, which is defined as the speed of the first take-off roll to the speed of the last calender roll, ranges from 1:1 to 1:3. The sheet may then be processed by a series of chill rolls for cooling and solidification. Thus, the use of this present invented process and polypropylene compositions enable the calendering process to be distinct from the conventional T-die or flat die extrusion process in various aspects such as broader thickness range (from 0.05 mm to 2.0 mm), reaching commercial acceptable speed (from 10 M/min. to 130 M/min. with improved thickness control across the sheet, and using a high level of fillers (up to 450 PHR). An air knife may be additionally installed to assist in the production of transparent polypropylene film and sheet. Optional embossing may be included to provide a desired surface texture. Furthermore, an in-line corona treating may be added which provides for high dyne level films and sheets.

The use of this kneading and calendering process enables polypropylene compositions to be calendered in conventional PVC film calendering lines at commercially acceptable production rates. Polypropylene film or sheet manufactured according to this process is superior to that of conventional extruding T-die. The advantages of polypropylene sheet or film can be summarized as follows: (1) mass production (2) even thickness distribution (3) excellent heat resistance (4) excellent printability and writability (5) low cost, and (6) recyclability into powder as additive to asphalt for pavement.

Obviously, numerous modifications and variations of the present invention are possible in light of the above teachings. It is therefore understood that within the scope of the appended claims, the invention may be practiced otherwise than as specifically described herein.

The examples described below are, but are not limited to, several preferred embodiments of the invention whereby the polypropylene resin compositions are calendered and formed into a film or sheet ranging in thickness from 0.05 mm–2.0 mm±5%, and having a width around 230 cm.

EXAMPLE 1

A mixture of 85 PHR polypropylene homopolymer (MFI=0.5), 15 PHR low density polyethylene resin (MFI=2.0), 5 PHR EPDM modifier (50 $ML_{1+8}$@125° C.), 100 PHR calcium carbonate (mean particle size=5 μm), 0.5 PHR carboxylic ester, and 3.0 PHR titanium dioxide is preblended in an intensive blender and further fluxed and homogenized by a kneader for 15 minutes at 35 RPM, 200° C. and 95% volume occupation. The plasticized mixture is transferred into the extruder to form strip extrudate and then transferred through a swivel conveyor to the calender unit. The calender operating conditions include maintaining the surface temperature of the calender rolls at 205°–230° C., a speed difference between the rolls of 1.5–2.5 M/min, the speed of the fifth calender roll (CR 5) at 20.5 M/min, the take-off ratio at 1.1:1, and the surface temperature of the take-off rolls at 150° C. with a gradual decrease to 60° C. The polypropylene sheet prepared wherein has a thickness of 0.5 mm±5% and a width of about 210 cm. The polypropylene composition, operation conditions, and physical properties of this example are shown as example #1 in Table 1, Table 2 and Table 3, respectively.

EXAMPLE 2

A mixture of 80 PHR polypropylene block copolymer (MFI=8), 20 PHR linear low density polyethylene resin (MFI=10), 400 PHR $CaCO_3$ (mean particle size=4 μm), 20 PHR EPDM (35 $ML_{1+8}$@125° C.), 1.0 PHR carboxylic ester and 10.0 PHR titanium dioxide is mixed using a sequential procedure, and is fluxed by a kneader at a temperature of 200° C., a rotor speed of 30 RPM and a volume occupation of 88% for 20 minutes. Next, an extruder forms a continuous strip. The extrudate is then transferred through a swivel conveyor to the calender unit. The calender operating conditions involve maintaining the surface temperature of the calender rolls at 204°–225° C., speed differences between successive rolls at 1.5–2.5 M/min, speed of the fifth calender roll (CR 5) at 24.0 M/min, take-off ratio at 2.5:1, and the temperatures of take off rolls at 60°–150° C. The film/sheet obtained wherein has thickness of 0.1 mm±5% and width of 220 cm. The polypropylene composition, operation conditions, and physical properties of this example are shown as example #2 in Table 1, Table 2 and Table 3, respectively.

EXAMPLE 3 TO 12

Examples 3 to 12 illustrate various polypropylene compositions. The formulations, calendering conditions and physical properties are summarized in Tables 1, 2 and 3, respectively.

TABLE 1

| | | | | Formulation of Calenderable Polypropylene Compositions | | | | | | |
|---|---|---|---|---|---|---|---|---|---|---|
| Example No. | PP | HDPE | LDPE | LLDPE | CaCO3 | Talc | Matrix Modifier | Anti-Static | Processing Aid | Pigment |
| 1 | 85 | | 15 | | 100 | | 5 | | 0.5 | 3 |
| 2 | 80 | 20 | | | 400 | | 20 | | 1 | 10 |
| 3 | 80 | 20 | | | 100 | | 15 | 10 | 2 | 10 |
| 4 | 80 | | | 20 | 100 | | 25 | 10 | 2 | |
| 5 | 80 | | | 20 | 80 | 40 | 10 | 8 | 1.3 | 25 |
| 6 | 80 | | | 20 | 200 | | 15 | 10 | 1.5 | 8 |
| 7 | 80 | | | 20 | 300 | | 10 | 12 | 1.8 | 4 |
| 8 | 90 | | | 10 | 70 | 30 | 15 | 15 | 1.3 | 22 |
| 9 | 80 | 10 | | 10 | | | 2 | | 1 | |

TABLE 1-continued

Formulation of Calenderable Polypropylene Compositions

| Example No. | PP | HDPE | LDPE | LLDPE | CaCO3 | Talc | Matrix Modifier | Anti-Static | Processing Aid | Pigment |
|---|---|---|---|---|---|---|---|---|---|---|
| 10 | 95 | — | | 5 | 60 | 20 | 2 | | 0.7 | 3 |
| 11 | 70 | 30 | | | 400 | | 10 | | 0.5 | 4 |
| 12 | 75 | | 25 | | 300 | | 30 | | 1.5 | 3 |

TABLE 2

Operation Conditions for Various Formulations Shown In Table 1

| Example No. | | Mixing Roll | Calender Roll 1 | Calender Roll 2 | Calender Roll 3 | Calender Roll 4 | Calender Roll 5 | Takeoff Roll | Emboss Roll | Cooling Roll |
|---|---|---|---|---|---|---|---|---|---|---|
| 1 | Speed m/min | | 13.9 ± 2 | 15.3 ± 2 | 17.0 ± 2 | 18.5 ± 2 | 20.5 ± 2 | 22.6 ± 3 | | 22.6 ± 3 |
| | Temperature °C. | | 217 ± 5 | 220 ± 5 | 224 ± 5 | 230 ± 5 | 205 ± 5 | 150 ± 5 | | 50 ± 5 |
| 2 | Speed m/min | 28 ± 3 | 15.4 ± 2 | 17.8 ± 2 | 20.1 ± 2 | 21.5 ± 2 | 24.0 ± 2 | 60 ± 3 | | 60 ± 3 |
| | Temperature °C. | 201 ± 5 | 218 ± 5 | 220 ± 5 | 223 ± 5 | 225 ± 5 | 204 ± 5 | 150 ± 5 | | 50 ± 5 |
| 3 | Speed m/min | 28 ± 3 | 25.9 ± 2 | 28.3 ± 2 | 30.1 ± 2 | 32.5 ± 2 | 35.0 ± 2 | 105 ± 3 | 105 ± 3 | 105 ± 3 |
| | Temperature °C. | 205 ± 5 | 223 ± 5 | 228 ± 5 | 235 ± 5 | 240 ± 5 | 220 ± 5 | 165 ± 5 | 80 ± 5 | 50 ± 5 |
| 4 | Speed m/min | 28 ± 3 | 25.4 ± 2 | 27.8 ± 2 | 30.2 ± 2 | 32.5 ± 2 | 35.0 ± 2 | 105 ± 3 | 105 ± 3 | 105 ± 3 |
| | Temperature °C. | 201 ± 5 | 222 ± 5 | 227 ± 5 | 233 ± 5 | 238 ± 5 | 220 ± 5 | 165 ± 5 | 80 ± 5 | 50 ± 5 |
| 5 | Speed m/min | 32.5 ± 3 | 25.3 ± 2 | 27.4 ± 2 | 29.5 ± 2 | 31.9 ± 2 | 34.2 ± 2 | 61.0 ± 3 | | 61.0 ± 3 |
| | Temperature °C. | 202 ± 5 | 225 ± 5 | 228 ± 5 | 232 ± 5 | 237 ± 5 | 220 ± 5 | 160 ± 5 | | 50 ± 5 |
| 6 | Speed m/min | 32.2 ± 3 | 24.2 ± 2 | 26.3 ± 2 | 28.5 ± 2 | 30.8 ± 2 | 33.2 ± 2 | 59.8 ± 3 | | 59.8 ± 3 |
| | Temperature °C. | 200 ± 5 | 223 ± 5 | 226 ± 5 | 229 ± 5 | 233 ± 5 | 214 ± 5 | 155 ± 5 | | 50 ± 5 |
| 7 | Speed m/min | 28.4 ± 3 | 23.3 ± 2 | 25.3 ± 2 | 27.7 ± 2 | 30 ± 2 | 32.1 ± 2 | 35.2 ± 3 | 35.2 ± 3 | 35.2 ± 3 |
| | Temperature °C. | 197 ± 5 | 220 ± 5 | 221 ± 5 | 220 ± 5 | 219 ± 5 | 199 ± 5 | 140 ± 5 | 75 ± 5 | 50 ± 5 |
| 8 | Speed m/min | | 23.3 ± 2 | 25.2 ± 2 | 27.2 ± 2 | 29.6 ± 2 | 31.9 ± 2 | 58.4 ± 3 | | 58.5 ± 3 |
| | Temperature°C. | | 224 ± 5 | 227 ± 5 | 233 ± 5 | 238 ± 5 | 220 ± 5 | 160 ± 5 | | 50 ± 5 |
| 9 | Speed m/min | | 16.5 ± 2 | 19 ± 2 | 21.4 ± 2 | 23.9 ± 2 | 25.6 ± 2 | 28.2 ± 3 | 28.2 ± 3 | 28.2 ± 3 |
| | Temperature °C. | | 224 ± 5 | 228 ± 5 | 234 ± 5 | 239 ± 5 | 225 ± 5 | 170 ± 5 | 80 ± 5 | 50 ± 5 |
| 10 | Speed m/min | | 10.5 ± 2 | 12.7 ± 2 | 14.5 ± 2 | 16.5 ± 2 | 18.4 ± 2 | 20.2 ± 3 | 20.6 ± 3 | 20.6 ± 3 |
| | Temperature °C. | | 229 ± 5 | 233 ± 5 | 237 ± 5 | 240 ± 5 | 226 ± 5 | 170 ± 5 | 85 ± 5 | 50 ± 5 |
| 11 | Speed m/min | | 6.1 ± 2 | 7.6 ± 2 | 8.2 ± 2 | 9.0 ± 2 | 9.4 ± 2 | 10.4 ± 3 | 10.6 ± 3 | 10.6 ± 5 |
| | Temperature °C. | | 204 ± 5 | 210 ± 5 | 215 ± 5 | 222 ± 5 | 201 ± 5 | 140 ± 5 | 80 ± 5 | 50 ± 5 |
| 12 | Speed m/min | 40 ± 3 | 19.2 ± 2 | 21.2 ± 2 | 23.3 ± 2 | 25.5 ± 2 | 28 ± 2 | 30.8 ± 3 | 30.8 ± 3 | 30.8 ± 3 |
| | Temperature °C. | 199 ± 5 | 223 ± 5 | 225 ± 5 | 227 ± 5 | 230 ± 5 | 222 ± 5 | 170 ± 5 | 85 ± 5 | 50 ± 5 |

TABLE 3

Physical Properties For Various Formulation Shown In Table 1

| Example No. | Film Thickness mm | Specific Gravity ASTM D1505 | Tensile Strength psi ASTM D638 MD | Tensile Strength psi ASTM D638 C | Elongation % ASTM D638 MD | Elongation % ASTM D638 CD | Elmendorff Tear g/mm ASTM D1922 MD | Elmendorff Tear g/mm ASTM D1922 CD | Gloss Value ASTM D2457 | Average Roughness μ NASI B46.1 | Bursting Strength kg/cm$^2$ ASTM D751 |
|---|---|---|---|---|---|---|---|---|---|---|---|
| 1 | 0.50 | 1.300 | 3600 | 2700 | 200 | 100 | | | | | |
| 2 | 0.10 | 1.883 | 2000 | 1200 | 65 | 30 | | | | | |
| 3 | 0.07 | 1.371 | 3325 | 2014 | 454 | 205 | 2985 | 1004 | 3.9/2.5 | 38/59 | 15 |
| 4 | 0.07 | 1.329 | 4230 | 2093 | 512 | 225 | 3023 | 952 | 2.8/2.5 | 39/56 | 14.5 |
| 5 | 0.15 | 1.422 | 2858 | 2428 | 352 | 195 | 2746 | 1025 | 2.6/3.0 | 28/43 | 15.2 |
| 6 | 0.15 | 1.606 | 2202 | 1488 | 403 | 240 | 2044 | 1069 | 2.5/3.8 | 28/48 | 11 |
| 7 | 0.40 | 1.752 | 2528 | 1306 | 74 | 38 | 1867 | 1287 | 2.4/2.4 | 30/47 | 3.5 |
| 8 | 0.15 | 1.375 | 2958 | 2842 | 582 | 308 | 2703 | 1104 | 2.6/3.5 | 28/36 | 15.5 |
| 9 | 0.50 | 0.910 | 3567 | 3124 | 595 | 350 | | | | | 25 |
| 10 | 1.20 | 1.291 | 5125 | 3843 | 578 | 345 | | | | | 20 |
| 11 | 2.00 | 1.950 | 1913 | 1352 | 55 | 26 | | | | | 1.5 |
| 12 | 0.50 | 1.748 | 2852 | 1543 | 278 | 156 | | | | | |

What is claimed is:

1. A process of manufacturing polypropylene film comprising the steps of:
 a. formulating a polypropylene composition containing:
  (1) a resin, said resin consisting essentially of:
   (a) polypropylene resin ranging in concentration from about 70 to about 100 parts per hundred parts by weight of said resin (PHR); and
   (b) polyethylene resin ranging in concentration from about 0 to about 30 PHR;
  (2) a matrix modifier ranging in concentration from about 2 to about 40 PHR;
  (3) a filler ranging in concentration from about 100 to about 450 PHR; and
  (4) a processing aid ranging in concentration from about 0 to about 5 PHR;
 b. mixing said composition using a high intensity/high shear mixer having at least one rotor to obtain a homogeneous and plasticized mixture;
 c. calendering said mixture into a film using a calender unit having a multiplicity of rolls, said rolls having a surface temperature between about 200° C. and about 250° C.;
 d. removing said film from said calender unit using take-off rolls; and
 e. cooling said film to ambient temperature.

2. The process according to claim 1 wherein said mixing is performed using sequential procedures wherein said resin, said matrix modifier, said filler, and said processing aid are added in an optimal time and temperature sequence.

3. The process according to claim 1 wherein said mixing is performed in a kneader having a pair of rotors and a mixing chamber, said mixing comprises maintaining a temperature range of about 170° to about 210° C. in said kneader, turning said rotors between about 15 and about 45 RPM, maintaining a speed ratio range of about 1:1 to about 1.3:1 between said rotors, filling the volume in said mixing chamber from about 80% to about 100%, and mixing said composition for about 8 to about 22 minutes in said kneader.

4. The process according to claim 1 wherein said calender unit comprises 4 to 6 rolls, each roll having a speed difference of about 1.0 M/min to about 3.5 M/min relative to an adjacent roll, said calender unit calenders said film from about 10 to about 130 M/min.

5. The process according to claim 1 wherein said mixture has a melt flow index (230° C./21.6N) between about 0.5 and about 4 g/10 min.

6. The process according to claim 1 wherein said polypropylene is propylene homopolymer having a melt flow index (230° C./21.6N) between 0.1 and 10 g/10 min and a specific gravity between 0.890 and 0.910.

7. The process according to claim 1 wherein said polypropylene is propylene copolymer having a specific gravity between 0.890 and 0.910, a melt flow index (230° C./21.6N) between 0.1 and 10 g/10 min, and a concentration of about 2 to about 18 mole percent of a comonomer selected from the group consisting of ethylene and butene-1.

8. The process according to claim 1 wherein said polyethylene is high density polyethylene (HDPE) having a melt flow index (190° C./21.6N) between 0.3 and 20 g/10 min and a specific gravity between 0.935 and 0.965.

9. The process according to claim 1 wherein said polyethylene is low density polyethylene (LDPE) having a melt flow index (190° C./21.6N) between 0.5 and 25 g/10 min and a specific gravity between 0.915 and 0.930.

10. The process according to claim 1 wherein said polyethylene is linear low density polyethylene (LLDPE) having a melt flow index (190° C./21.6N) between 0.5 and 25 g/10 min, a specific gravity of 0.900–0.925, and a concentration of about 7 to about 20 mole percent of α-olefin comonomer selected from the group consisting of butene, hexene, 4-methyl-1 pentene and octene.

11. The process according to claim 1 wherein said modifier is selected from the group consisting of ethylene-propylenediene monomer, ethylene-propylene monomer, polyisobutylene, butyl rubber and neoprene; and wherein said modifier has a Mooney viscosity between 25 and 100 $ML_{1+8}$@125° C.

12. The process according to claim 1 wherein said processing aid is selected from the group consisting of polyvinylidene fluorides, metallic stearates, and higher molecule weight carboxylic esters having carbon atoms greater than 18, and mixtures thereof.

13. The process according to claim 1 wherein said filler is selected from the group consisting of wood flour, zinc oxide, reinforced fiber, metal powder, mica, talc, kaolin and calcium carbonate and mixtures thereof.

14. The process according to claim 13 wherein said calcium carbonate has a mean particle size of about 2 to 15 μm and a specific surface area from about 8,000 to about 12,000 $cm^2/g$.

15. The process according to claim 13 wherein said talc have a mean particle size from about 2 to about 10 μm and an aspect ratio ranging from about 15 to about 20.

* * * * *